Aug. 9, 1949.  L. R. JACKSON ET AL  2,478,659
APPARATUS FOR EROSION TESTING
Filed Nov. 18, 1944
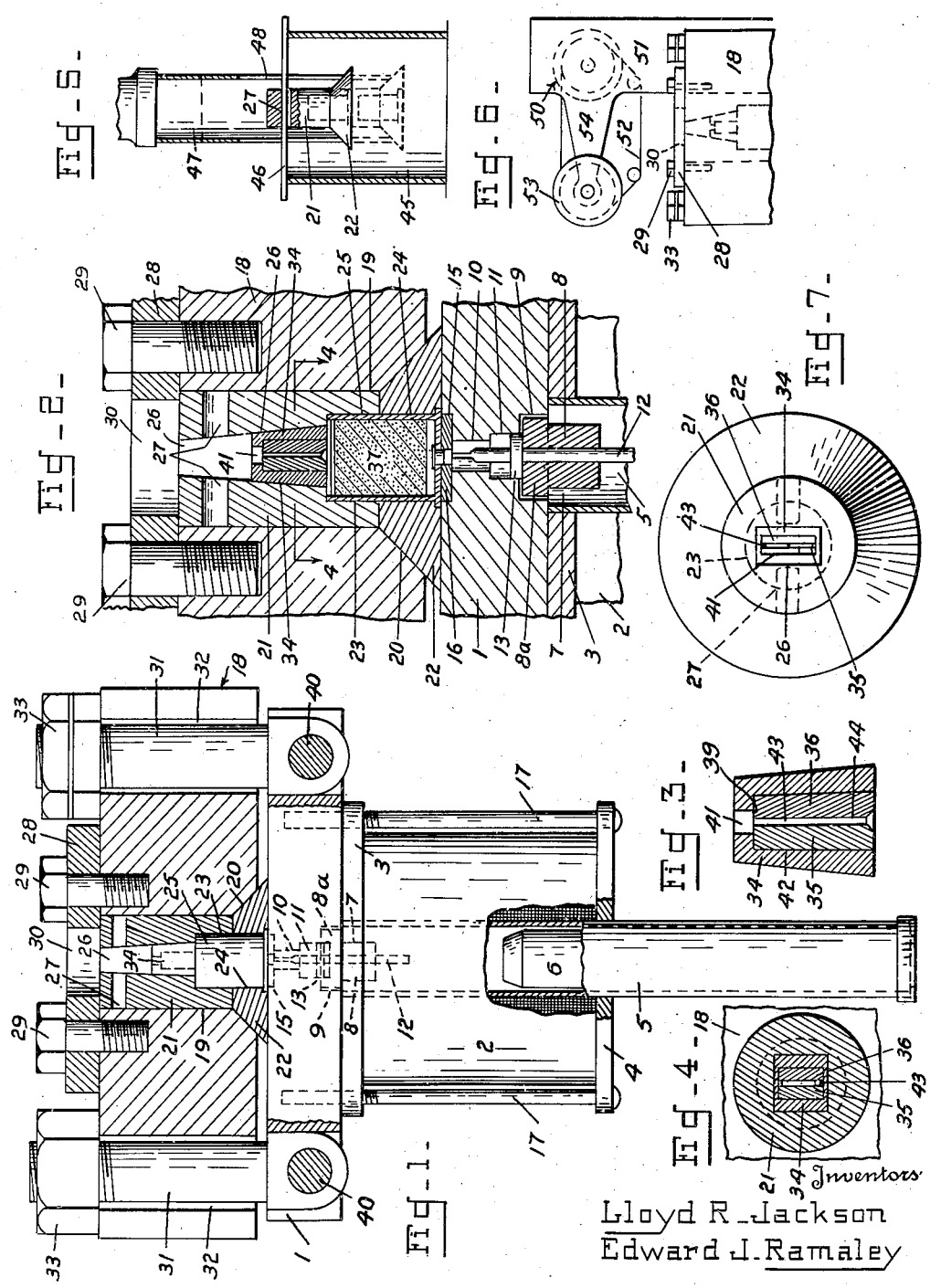
Inventors
Lloyd R. Jackson
Edward J. Ramaley Patented Aug. 9, 1949

2,478,659

UNITED STATES PATENT OFFICE 2,478,659

APPARATUS FOR EROSION TESTING

Lloyd R. Jackson and Edward J. Ramaley, Columbus, Ohio, assignors to Battelle Memorial Institute, Columbus, Ohio, a corporation of Ohio Application November 18, 1944, Serial No. 564,156

3 Claims. (Cl. 73—7)

This invention relates to an apparatus for testing the resistance of materials to erosion. It is adapted for classifying materials in regard to their relative resistance to erosion by gases, and it is especially suited for erosion tests of metals under conditions simulating those in a gun barrel in service.

It is an object of this invention to provide an apparatus for determining the relative erosion resistance of materials.

Another object of our invention is to provide a means of determining the relative erosion rates of materials when subjected to the erosive action of hot gases under conditions of the type encountered in gun barrels, gas turbines, superchargers, jet propulsion devices, rocket motors, and similar applications.

Yet another object of this invention is to provide a test unit for experimental work which will repeatedly and accurately reproduce the conditions existing in the bore of a gun during firing, without the necessity for discharging high velocity ammunition.

A further object of this invention is to provide a test unit which will produce greatly accelerated erosion of test steel specimens.

Other and further objects of this invention will be apparent from the following detailed disclosure and as pointed out in the appended claims.

In order to illustrate the apparatus of our invention and to enable a clear understanding of its novel features as well as the scientific fundamentals involved, reference is had to the accompanying drawings, illustrating a preferred embodiment of one form of our invention primarily adapted for the testing of barrel materials, in which:

Figure 1 is a longitudinal sectional view of the test unit.

Figure 2 is an enlarged fragmentary view of the test unit showing the arrangement of the barrel, cartridge, and firing mechanism in detail.

Figure 3 is an enlarged longitudinal sectional view of the specimen holder.

Figure 4 is a cross sectional view taken along the plane 4—4 of Figure 2.

Figure 5 is a cross sectional view showing an arrangement whereby the cartridge may be readily removed from the barrel when such cartridge is difficult to extract by normal means.

Figure 6 is a side elevational view showing apparatus for recording time interval of gas flow.

Figure 7 is a fragmentary top elevational view of the barrel and ring assembly removed from the gun.

Before explaining in detail the present invention, it is to be understood that the invention is capable of being practiced or carried out in various ways, it being understood also that the phraseology or terminology employed herein is for the purpose of illustration and not of limitation.

For the purposes of illustration, this invention will be described primarily in its relation to the testing of materials for use in gun barrels; however, it is to be understood that the apparatus and the principles herein described are adaptable with only minor changes to the testing of other types of materials to determine their relative erosion rate under various types of service.

In the illustrated embodiment of our invention:

Figure 1 shows in assembled relation an experimental unit embodying the principles of this invention. The unit essentially comprises a rectangular block 18 having a centrally located bore 19 in which the combustion chamber elements are mounted, a breech block 1, and a firing mechanism secured to the breech block. The block 18 is supported in any desired manner and is provided about its periphery with a plurality of recesses 32. The breech block 1 is rigidly secured to the block 18 by means of a plurality of bolts 31 which are pivotally mounted on the periphery of the breech block 1 on pins 40. Bolts 31 are arranged to pivotally enter respective recesses 32 of block 18 and are bolted thereto by nuts 33.

The firing mechanism is mounted on the underside of breech block 1 and comprises a solenoid 2 which is supported between two spaced plates 3 and 4 which are in turn secured to breech block 1 by means of a plurality of bolts 17. A tube 5 of non-magnetic material is mounted thru the center of solenoid 2 and projects below the solenoid. Within the tube 5 is located a plunger type hammer 6 of magnetic material. In the center of plate 3, which is adjacent the bottom surface of breech block 1 as shown in Figure 1, there is provided a hole 7 in which is located a flanged bushing 8 having its flange 8a resting against the top surface of plate 3.

The bottom surface of breech block 1 is provided with a recess 9 which accommodates the flange 8a on the bushing 8. A vertical hole 10 is provided thru breech block 1 concentric with bushing 8 and a firing pin 12 is mounted therein. Firing pin 12 has a collar 13 which travels in a counterbored portion 11 of hole 10. Movement of the firing pin is thus limited by cooperation of collar 13 with the flange 8a and the end of the counterbored portion 11. The top surface of breech block 1 is provided with a counterbore 15 about the hole 10 and a hardened bushing 16 (Figure 2) is inserted therein. Bushing 16 serves not only for a guide for firing pin 12 but also supports the base of the cartridge case, as will be presently described.

The hole 19 in block 18 is provided with a conical counterbored portion 20 at its bottom end to receive a correspondingly shaped support ring 22. When the breech block 1 is securely fastened to the block 18, the support ring 22 is forced into full engagement into the conical counterbored portion 20 of block 18. The support ring 22 is provided with an axial chamber 24 which is shaped to receive the end portion of a cartridge case 25.

As shown in more detail in Figure 2, a barrel 21 is snugly mounted within the hole 19. Barrel 21 comprises a hollow cylindrical member having a concentric counterbored portion 23 at its base which aligns with the hole 24 in support ring 22 and in conjunction therewith forms a chamber for the cartridge case 25 which, for example, may comprise the powder containing portion of a 12-gage shotgun shell having a powder charge 37. Extending upwardly thru barrel 21 from the counterbored portion 23 there is provided a tapered longitudinal hole 26. A transverse radial hole 27 may also be provided in the upper end of barrel 21 for a purpose to be described. A plate 28 is secured to the top of block 18 by means of bolts 29 and is provided with a hole 30 which is concentrically aligned with the end of the tapered hole 26 in barrel 21. Plate 28 also cooperates with support ring 22 to hold the barrel 21 firmly in place.

A specimen holder 34 is provided in the form of a hollow conical member which is shaped to enter the enlarged portion of tapered hole 26 and to engage therein in wedging relation. The specimen holder 34 is centrally recessed to provide a central hole 41 (Figure 3) when assembled. The hole 41 thus formed is counterbored from the enlarged end of specimen holder 34 for a substantial distance to provide a test specimen stopping surface 39 and a specimen chamber 42. Test specimens 35 and 36 are then inserted in specimen chamber 42. Each test specimen preferably comprises a semi-cylindrical member but the specimens are spaced apart by shims 43 to define an orifice 44 (Figures 2 and 3).

This experimental unit has proved particularly valuable in conducting accelerated erosion tests of gun barrel steels. With this device test specimen 35 may be fabricated from a standard material, that is, a material whose erosion characteristics and life are known. If test specimen 36 is fabricated from the unknown material to be tested, a very accurate comparative test is accomplished since both specimens are subjected to identical erosion conditions. The two specimens, the standard and unknown, are inserted in specimen chamber 42 formed by the specimen holder 34 and separated by shims 43 of desired thickness to form an axial orifice 44. This assembly is then inserted in the tapered hole 26 in the test barrel 21. The cartridge case 25 containing a measured charge of powder 37 is inserted in the chamber defined by the counterbore 23 of the test barrel and the hole 24 of the ring support 22. The breech block 1 is then secured to the block 18 and the whole assembly is thus rigidly locked together due to the wedging action between the several components.

The test unit may now be fired by energization of the solenoid 2 from a suitable source of electric current (not shown). The magnetic forces of the solenoid 2 cause the hammer 6 to rise, striking the firing pin 12, which in turn discharges the primer of the cartridge case 25. The gases generated by the explosion of the powder charge 37 are expelled thru the narrow orifice 44 defined by the surfaces of the test specimens 35 and 36 and hence such surfaces are subjected to the eroding action of high pressure, high temperature, high velocity gases under conditions very similar to that obtained in the discharge of a projectile in a gun barrel.

Following the firing of a cartridge, the test unit is disassembled to load the next cartridge. In the event that difficulty is experienced in extraction of the cartridge case 25 due to the expansion produced by the firing, the transverse radial hole 27 in barrel 21 may be utilized as illustrated in Figure 5 to secure extraction. As shown in this figure the barrel 21 and support ring 22 secured together by the binding action of the cartridge 25 are supported on a hollow member 45, such as a piece of pipe, by means of a rod 46 slipped thru transverse radial hole 27. A second hollow member 47 having suitable longitudinal slots 48 to clear the rod 46 is slipped over the end of barrel 21 and engages support ring 22. The member 47 is then hammered and the resulting forces on support ring 22 will free cartridge 25 from barrel 21 and permit its extraction.

Under conditions produced by this unit it has been found that the erosion of the test specimen surfaces is greatly accelerated and an accurate indication of erosion life of any unknown specimen may be obtained in 50 shots or less. The rapidity of accelerated erosion is, of course, dependent upon the weight of powder with which the cartridge case 25 is loaded. Best results have been observed with powder charges ranging from .25 to 1 gram.

Another obvious factor influencing rate of erosion of the test specimens is the length of time of flow of the high pressure, high temperature gases past the test specimen. Such rate is, of course, dependent upon the weight of powder charge used and its burning characteristics, but in addition depends upon the area of the orifice 44 defined by test specimens 35 and 36 and, of course, the length of test specimens 35 and 36 along which the gas flow occurs. For proper interpretation of tests made with this experimental gun, it is necessary than an accurate and reliable method and apparatus for recording the time of gas flow be utilized.

The improved method devised to solve this problem is illustrated by the apparatus shown in Figure 6. The apparatus comprises a disk 50 rotated at a constant known speed by a suitable motor 51 and a pulley 53 mounted in a horizontally extending arm 54. Around the periphery of disk 50 and pulley 53 there is placed a belt 52 of paper or other suitable material which will char upon exposure to hot gases. The belt 52 is then positioned with respect to the test unit so that the gases from the discharge of the cartridge 25 passing thru the hole 30 in plate 28 impinge upon the belt of paper 52 on the rotating disk 50. The gases will thereby produce a charring of that portion of paper belt 52 which has been exposed to their action. Accordingly, the speed of rotation of the disk 50 being known, the time of gas flow may be determined by measurement of the length of charring on the paper strip 52. Despite the relatively short duration of gas flow which is on the order of several thousandths of a second, this method and apparatus nevertheless affords accurate and reliable measurement of the time of gas flow.

Although our invention has been described primarily with reference to its application in rating the relative erosion resistance of materials for use in gun barrels, it will be readily apparent to one skilled in the art that the method and apparatus herein disclosed can be readily adapted for use in connection with materials intended for other types of service involving erosive action. For example, in the case of materials for use in gas turbines, the breech block and the firing mechanism might be eliminated and a suitable combustion chamber connected directly to chamber 23 of barrel 21 in such a manner that the hot expanding gases from the combustion chamber are forced to exit through the orifice 44 between the test specimens 35 and 36.

With the apparatus described herein, the results of erosion tests may not only be observed by the comparison of the unknown with the standard specimen after testing but quantitative determinations may also be made by measurement of the weight loss of the test specimen over the period of the test. By controlling the orifice dimensions, the erosion rate of the test specimens in this apparatus may be so adjusted that a readily measurable weight loss from the test specimens may be noted in a relatively short-time test.

We claim:

1. A test gun comprising a base, said base having a recess shaped to define a chamber portion and a tapered barrel portion decreasing in diameter away from said chamber portion, a breech block member detachably secured to said base and arranged to confine a powder charge in said chamber portion, said tapered barrel portion constructed to receive a test specimen unit having a restricted gas passage therethrough and a tapered exterior portion corresponding to said tapered barrel portion whereby said unit is rigidly secured therein by wedging action, said chamber portion arranged to communicate with said gas passage when said unit is engaged in said tapered barrel portion, and means arranged to fire said powder charge and discharge a flow of gases through said restricted gas passage for erosive action on the walls thereof.

2. A test unit comprising a base, said base having a recess shaped to define a chamber portion and a tapered barrel portion decreasing in diameter away from said chamber portion, a fluid source secured to said base and arranged to supply a flow of fluid in said chamber portion, a test specimen holder having a passage therethrough and a tapered exterior surface thereon receivable in said tapered barrel portion, said chamber portion arranged to communicate with said passage when said holder is engaged in said tapered barrel portion, and means for discharging fluid to flow through said passage.

3. A test specimen assembly adapted for insertion in a tapered barrel portion of a test unit, said assembly comprising, a support member having a tapered exterior for wedge engagement with the tapered barrel portion whereby said support member may be rigidly secured therein, said support member having an axial bore at the small tapered end and a counterbore at the large end thereof thereby providing a stopping surface at the junction of said bore and counterbore, a pair of test specimens in said counterbore positioned against said stopping surface, each of said test specimens having an inwardly facing flat face, and means for separating said flat faces to define an orifice between said test specimens.

LLOYD R. JACKSON.
EDWARD J. RAMALEY.

REFERENCES CITED

The following references are of record in the file of this patent:

UNITED STATES PATENTS

| Number | Name | Date |
| --- | --- | --- |
| 829,117 | Maxim | Aug. 21, 1906 |
| 1,386,087 | Blankenhorn | Aug. 2, 1921 |
| 1,476,775 | Sproull | Dec. 11, 1923 |
| 1,801,449 | Olsen et al. | Apr. 21, 1931 |
| 2,111,315 | Damblanc | Mar. 15, 1938 |
| 2,283,954 | Schroeder et al. | May 26, 1942 |
| 2,377,425 | Jackson | June 5, 1945 |